United States Patent
Hofmann et al.

(10) Patent No.: US 6,273,120 B1
(45) Date of Patent: Aug. 14, 2001

(54) DEVICE FOR INTRODUCING A LIQUID REDUCING AGENT INTO AN EXHAUST GAS PURIFICATION SYSTEM

(75) Inventors: Lothar Hofmann, Altenkunstadt; Wieland Mathes, Michelau, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/569,285

(22) Filed: May 12, 2000

Related U.S. Application Data

(63) Continuation of application No. PCT/DE98/03335, filed on Nov. 12, 1998.

(51) Int. Cl.[7] .................................................. G05D 11/13
(52) U.S. Cl. .............................................. 137/98; 60/286
(58) Field of Search ........................... 60/286; 137/114, 137/98

(56) References Cited

U.S. PATENT DOCUMENTS

| | | | |
|---|---|---|---|
| 1,853,863 | * 4/1932 | Hornbruch | 137/114 |
| 3,905,451 | * 9/1975 | Williamson | 137/114 X |
| 4,574,589 | * 3/1986 | Hasegawa et al. | 60/286 |
| 5,407,649 | 4/1995 | Andersson . | |
| 5,522,218 | 6/1996 | Lane et al. . | |
| 5,884,475 | * 3/1999 | Hofmann et al. | 60/286 X |

FOREIGN PATENT DOCUMENTS

| | | |
|---|---|---|
| 27 53 601 | 6/1979 | (DE) . |
| 36 15 705 A1 | 11/1987 | (DE) . |
| 33 37 793 C2 | 3/1988 | (DE) . |
| 36 34 449 A1 | 4/1988 | (DE) . |
| 38 00 730 A1 | 8/1988 | (DE) . |
| 42 21 363 A1 | 1/1993 | (DE) . |
| 42 21 155 C1 | 9/1993 | (DE) . |
| 44 17 238 A1 | 9/1994 | (DE) . |
| 43 20 410 A1 | 12/1994 | (DE) . |
| 0 278 241 A1 | 8/1988 | (EP) . |
| 0 583 878 A1 | 2/1994 | (EP) . |
| 0 586 913 A2 | 3/1994 | (EP) . |
| 1403738 | * 5/1964 | (FR) ...................................... 137/114 |

OTHER PUBLICATIONS

Published International Application No. WO 96/08639 (Hofmann et al.), dated Mar. 21,1996.
Excerpt from "Fluidtechnik von A bis Z" (Ebertsshäuser), Vereinigte Fachverlage, p. 107–108, (fluid technique A to Z).

* cited by examiner

*Primary Examiner*—Stephen M. Hepperle
(74) *Attorney, Agent, or Firm*—Herbert L. Lerner; Laurence A. Greenberg; Werner H. Stemer

(57) ABSTRACT

A device for introducing a liquid reducing agent into an exhaust gas purification system includes a gas line for receiving and carrying a gas, a reducing agent line for receiving and carrying a liquid reducing agent, a mixing chamber for mixing the reducing agent with the gas, the mixing chamber fluidically connected to the gas line and to the aid reducing agent line, a metering valve disposed in the reducing agent line; and a control device for controlling a pressure in the reducing agent line dependent upon a gas pressure in the gas line. The control device can also be used for controlling the reducing agent throughput in the reducing agent line in dependence on the gas pressure in the gas line.

17 Claims, 2 Drawing Sheets

DEVICE FOR INTRODUCING A LIQUID REDUCING AGENT INTO AN EXHAUST GAS PURIFICATION SYSTEM

CROSS-REFERENCE TO RELATED APPLICATION

This is a continuation of copending international application PCT/DE98/03335, filed Nov. 12, 1998, which designated the United States.

BACKGROUND OF THE INVENTION

FIELD OF THE INVENTION

The invention relates to a device for introducing a liquid reducing agent into an exhaust gas purification system. It is used particularly, in an internal combustion engine, in the exhaust gas purification system equipped with a regulated or controlled diesel catalyst ("GDK"). It may also be used in an exhaust gas purification system for stationary diesel engines, for example, with a mechanical power of up to a 1000 kW.

Above all other methods, the technique using regulated or controlled diesel catalyst GDK has proved to be advantageous in order to reduce the pollutants, in particular, nitrogen oxides, contained in the exhaust gas of an internal combustion engine operated with air excess, such as, for example, in diesel and lean-burn engines. In the technique, which is based essentially on the method of selective catalytic reduction ("SCR"), the nitrogen oxides are brought into contact with ammonia at a selective catalyst and are converted there into nitrogen and water.

Due to risks associated with using ammonia, specifically, its toxicity, and because of the troublesome smell generated by ammonia, ammonia is not generally carried in a vehicle using an internal combustion engine equipped with a GDK system. The reducing agent necessary for the catalytic conversion of the nitrogen oxides is, therefore, transported in the vehicle in liquid form as an aqueous urea solution. The ammonia is produced from the aqueous urea solution by hydrolysis in a precise quantity required at a particular moment for conversion of the nitrogen oxides. Where stationary smoke gas purification systems are concerned, for example, downstream of power stations, pure ammonia or ammonia water can be used.

German Published, Non-Prosecuted Patent Application DE 44 17 238, provides for directly leading the exhaust line of a truck diesel engine laterally up to a cylindrical inlet chamber, in which is disposed a funnel-shaped perforated plate. At the narrowest point of the funnel, an injection valve is provided, through which an aqueous urea solution is injected into the inner space of the funnel. A homogenous distribution of the urea solution in the exhaust gas over the entire cross section of the inlet chamber is achieved. A hydrolysis catalyst, a DeNOx catalyst and, if appropriate, an oxidation catalyst, follows the inlet chamber.

A solution differing from application DE 44 17 238 is disclosed in International PCT publication WO 96/36797. In order to obtain a sufficient nebulization of the liquid reducing agent to be atomized, i.e., the reducing agent urea, before introduction into the pollutant-laden exhaust gas stream, a mixing device or mixing chamber is provided there. Into the mixing chamber are introduced the liquid reducing agent and the gas, for example, air, for intimate mixing with one another, i.e., to form an emulsion. The mixing chamber is connected through a single mixing line or pipeline to an atomizer nozzle that is disposed in the exhaust gas stream. An adjustable metering valve precedes the mixing chamber.

The metering valve aids in the predetermination of the reducing agent quantity necessary per unit time. The reducing agent quantity flowing through the opened metering valve per unit time is directly dependent on the differential pressure across the metering valve. In order to ensure a constant metering rate for the reducing agent in the prior art device, it is necessary to have a constant differential pressure.

The differential pressure prevailing across the metering valve in a prior art device depends both on the pressure in the reducing agent line upstream of the metering valve and on the pressure in the mixing chamber. Therefore, the differential pressure also depends on the gas pressure in the gas line leading into the mixing chamber. A pump preceding the metering valve for conveying the reducing agent generates the pressure. However, both the gas pressure and the pressure in the reducing agent line may experience fluctuations.

SUMMARY OF THE INVENTION

It is accordingly an object of the invention to provide a device for introducing a liquid reducing agent into an exhaust gas purification system that overcomes the hereinafore-mentioned disadvantages of the heretofore-known devices of this general type and that meters the reducing agent quantity introduced per unit time simply and accurately.

With the foregoing and other objects in view, there is provided, in accordance with the invention, a device for introducing a liquid reducing agent into an exhaust gas purification system, including a gas line for receiving and carrying a gas, a reducing agent line for receiving and carrying a liquid reducing agent, a mixing chamber for mixing the reducing agent with the gas, the mixing chamber fluidically connected to the gas line and to the reducing agent line, a metering valve disposed in the reducing agent line, and a control device for controlling a pressure in the reducing agent line dependent upon a gas pressure in the gas line.

The device contains a mixing chamber for mixing the reducing agent with a gas, into which mixing chamber open a reducing agent line carrying the reducing agent and a gas line carrying the gas, and a control device for controlling the reducing agent throughput in the reducing agent line in dependence on the gas pressure in the gas line. Accordingly, the reducing agent throughput, i.e., the quantity of reducing agent injected into the mixing chamber per unit time, can be influenced in a precisely directed way, so that it is possible to eliminate a dependence (present in the prior art) on the gas pressure in the gas line, the gas pressure essentially determining the pressure in the mixing chamber. By a precisely directed control of the reducing agent throughput (used as a correcting variable), the gas pressure (disturbance variable) influencing or disturbing the reducing agent throughput, it is possible to keep the reducing agent throughput constant, regardless of the gas pressure in the gas line.

In a particularly preferred refinement of the invention, the control device for controlling the reducing agent throughput is an actuating member for controlling the pressure in the reducing agent line. In particular, the actuating member provided is a pressure control valve that is controlled by the gas pressure and that preferably controls the pressure in the reducing agent line, starting from the inlet of an adjustable metering valve preceding the mixing chamber. Because the reducing agent throughput depends on the pressure drop at the metering valve preceding the mixing chamber, the reducing agent throughput can be influenced by the setting of the pressure in the reducing agent line upstream of the metering valve. In particular, the pressure is controlled such that the pressure difference at the metering valve and, therefore, also the reducing agent throughput, with the metering valve open, are approximately constant.

In one embodiment, the pressure control valve is connected to a branch line opening into the reducing agent line. It is thereby possible to control the pressure in the reducing agent line by the extraction of a reducing agent part stream from the reducing agent line. The branch line is connected to the reducing agent line preferably upstream of the metering valve, as seen in the direction of flow.

In particular, the branch line opens into a reservoir, to which the reducing agent line is also connected for the extraction of the reducing agent. The configuration gives rise to a recirculation of the extracted reducing agent part stream.

In one embodiment, the pressure control valve provided is a three-way valve disposed in the reducing agent line and to which the branch line is connected.

In an alternative embodiment, the pressure control valve is a two-way valve disposed in the branch line.

In accordance with a concomitant feature of the invention, the control device is connected to the gas line through a pressure extraction line, the pressure control valve preferably being controllable pneumatically. The configuration makes it possible to have a particularly simple control of the reducing agent throughput, without additional electronic devices, such as, for example, a pressure sensor and an electrical control circuit for activating an electrically operable actuating member.

Other features that are considered as characteristic for the invention are set forth in the appended claims.

Although the invention is illustrated and described herein as embodied in a device for introducing a liquid reducing agent into an exhaust gas purification system, it is nevertheless not intended to be limited to the details shown because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
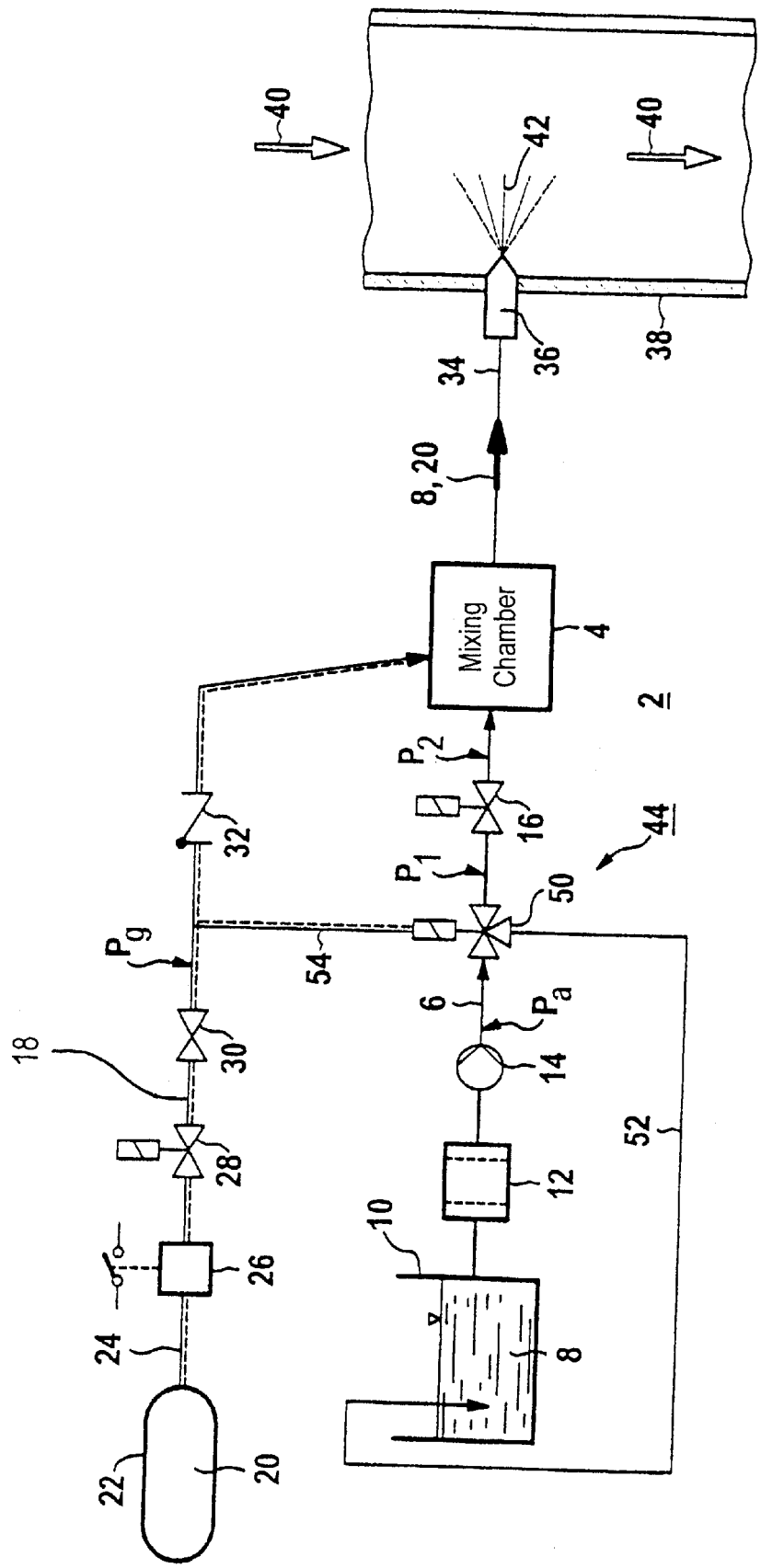
FIG. 1 is a diagrammatic illustration of a device for introducing a liquid reducing agent into an exhaust gas purification system according to the invention.

In all the figures of the drawing, sub-features and integral parts that correspond to one another bear the same reference symbol in each case.

Referring now to the figures of the drawing in detail and first, particularly to FIG. 1 thereof, is shown a device 2 according to the invention having a mixing device or mixing chamber 4 that is configured preferably on the carburetor principle according to the above cited International PCT application WO 96/36797.

A reducing agent line 6 for a liquid reducing agent 8 to be atomized, for example, an aqueous urea solution, opens into the mixing chamber 4. The reducing agent 8 is accommodated in a reservoir carried on a vehicle, the exhaust gas of which is to be purified. The reservoir 10 is connected to the mixing chamber 4 through a filter 12, a pump 14, and a metering valve 16 that are located in the reducing agent line 6.

The pump 14 conveys the reducing agent 8 out of the reservoir 10 and, at the pump outlet, generates a pressure $p_a$ that may experience fluctuations that depend, for example, on the filling level of the reducing agent 8 in the reservoir 10 or on the contamination of the filter 12.

An adjustable metering valve 16 that is actuable electromagnetically between an open and a closed position precedes the mixing chamber 4. The time during which the metering valve 16 is open and the time during which the metering valve 16 is closed influence the throughput of the reducing agent. With the metering valve 16 open, the reducing agent throughput, i.e., the reducing agent quantity flowing through the metering valve 16 per unit time ("metering rate"), depends on the setting of the metering valve 16, the flow resistance in the open position, the inlet-side pressure $p_1$ in the reducing agent line 6, and also on the outlet-side pressure $p_2$ that, in the exemplary embodiment in which the metering valve 16 directly precedes the mixing chamber 4, corresponds approximately to the pressure within the mixing chamber 4.

A gas 20, for example, air, passes into the mixing chamber 4 through a gas line 18. The gas 20 is mixed in the mixing chamber 4 with the inflowing reducing agent 8. At the same time, an aerosol 8, 20 is generated, which is discharged at the outlet of the atomizer nozzle 36. The gas 20 is accommodated in a pressure accumulator 22 that is provided with an outlet 24. The gas 20 is conducted from the outlet 24 into the mixing chamber 4 through an electrically actuable pressure switch 26, a shutoff valve 28, an adjustable pressure relief valve 30 and a nonreturn valve 32.

The mixture 8, 20 generated in the mixing chamber 4 passes through a mixing line 34 to an atomizer nozzle 36 that is accommodated in an exhaust duct 38. In the exhaust duct 38, the exhaust gas 40 to be purified flows in the direction of a non-illustrated catalyst configuration. The atomizer nozzle 36 ensures that the mixture of reducing agent 8 and pressure gas 20 is injected in a fine mist 42 into the stream of exhaust gas 40 and is carried further along and distributed uniformly by the exhaust gas 40 in the direction of the catalyst configuration.

A control device 44 for controlling the reducing agent throughput in the reducing agent line 6 contains a pressure control valve 50. The control valve 50 is disposed between the metering valve 16 and the pump 14 and is configured as a three-way valve. For controlling the pressure $p_1$ of the inlet of the metering valve 16, the first and second path of the pressure control valve 50 is connected to the reducing agent line 6, and a third path of the pressure control valve 50 is connected to a branch line 52 that opens into the reservoir 10.

The pressure control valve 50 is controllable pneumatically and is connected through a control line 54 to the gas line 18 downstream of the adjustable pressure relief valve 30, downstream defined with respect to the gas 20 flow direction. Thus, the position of the closing member of the pressure control valve 50 is controlled or set by the gas pressure $p_g$ prevailing in the gas line 18 at the opening point for the control line 54. Thus, depending on the gas pressure $p_g$, the reducing agent part stream is extracted from the reducing agent line 6. The reducing agent part stream amounts, with the pressure control valve 50 closed, to 100% of the total stream and, with the pressure control valve 50 completely open, may, depending on the configuration, be virtually 0%. With the aid of the gas pressure $p_g$, the reducing agent part stream can then be set at between 0% and 100% of the total stream. In practice, however, the range is not utilized. The pressure $p_1$ of the inlet of the metering valve 16, and, consequently, also of the reducing agent throughput dependent on the pressure difference $p_2-p_1$, is controlled in dependence on the gas pressure $p_g$. At the same time, in order to compensate the pressure $p_2$ (which is influenced by the gas pressure $p_g$ and, therefore, also falling) at the outlet side of the metering valve 16, and to keep the pressure difference $p_2-p_1$ across the metering valve 16 constant, the pressure control valve 50 is controlled such that, with a falling gas pressure $p_g$, the reducing agent part stream recirculated through the branch line 52 is increased and the inlet-side pressure $p_1$ is correspondingly lowered. In other words, the metering quantity (the total quantity of reducing agent added in a time segment) can be set in a highly defined manner by the opening duration of the metering valve 16 that occurs in the time segment because the metering rate (the reducing agent quantity flowing through the open metering valve 16 per unit time) remains constant due to the control of the pressure $p_1$.

Figure 2:
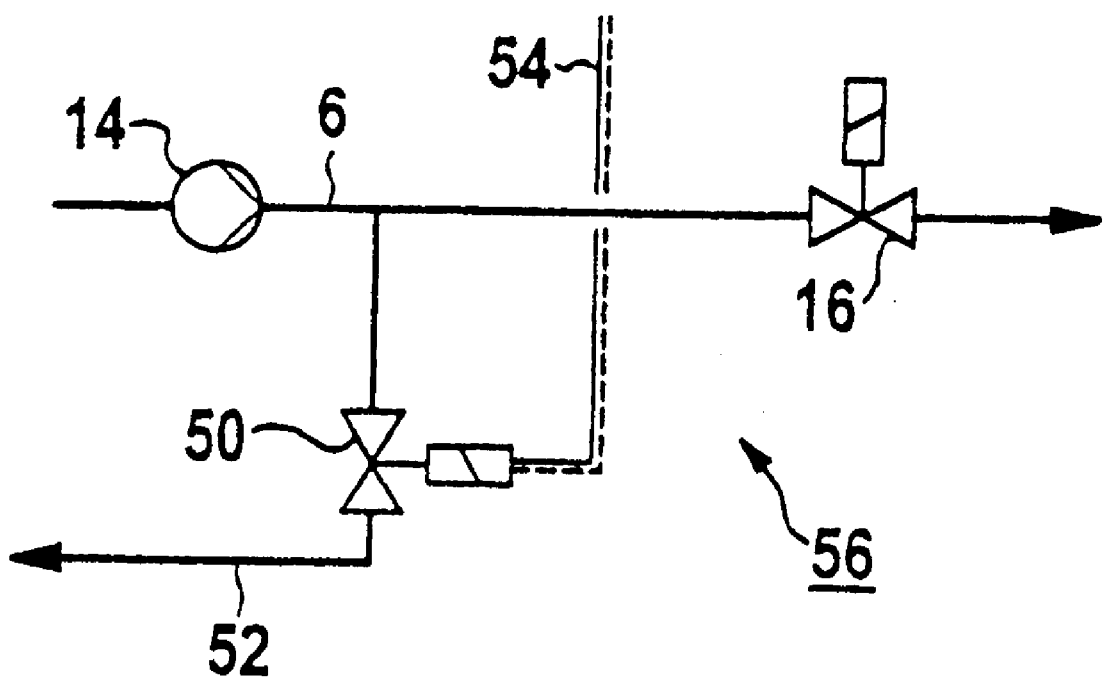
FIG. 2 is a diagrammatic illustration of an alternative embodiment of a control device for the invention of FIG. 1.

In the embodiment according to FIG. 2, an alternative control device 56 is shown. The control device 56 controls the reducing agent throughput in the reducing agent line 6 and uses a two-way valve as the pressure control valve 50. The two-way valve takes the place of the three-way valve provided in the reducing agent line 6 shown in FIG. 1. The two-way pressure control valve 50 is disposed in the branch line 52 and is controllable pneumatically through the control line 54. The two-way pressure control valve 50 is likewise dependent upon the gas pressure in the gas line, and, depending on the gas pressure, controls the quantity of the branched reducing agent 8. Therefore, the two-way pressure control valve 50 also controls the pressure in the reducing agent line 6 on the inlet side of the metering valve 16.

We claim:

1. A device for introducing a liquid reducing agent into an exhaust gas purification system, comprising:
   a gas line for receiving and carrying a gas;
   a reducing agent line for receiving and carrying a liquid reducing agent;
   a mixing chamber fluidically connected to said gas line and to said reducing agent line for mixing the reducing agent with the gas;
   a metering valve disposed in said reducing agent line, across which a pressure difference is created; and
   a control device controlling a reducing agent pressure in said reducing agent line dependent upon a gas pressure in said gas line to keep the pressure difference constant.

2. The device according to claim 1, wherein said control device includes an actuating member for controlling the pressure in said reducing agent line.

3. The device according to claim 2, wherein said actuating member is a pressure control valve controlled by the gas pressure in said gas line.

4. The device according to claim 3, wherein said metering valve precedes said mixing chamber with respect to a flow direction of the reducing agent and has an inlet, and said pressure control valve is disposed at said inlet of said metering valve.

5. The device according to claim 3, including a branch line, said pressure control valve fluidically connecting said branch line to said reducing agent line.

6. The device according to claim 4, including a branch line, said pressure control valve fluidically connecting said branch line to said reducing agent line.

7. The device according to claim 5, wherein said branch line is connected to said reducing agent line upstream of said metering valve with respect to a flow direction of the reducing agent.

8. The device according to claim 6, wherein said branch line is connected to said reducing agent line upstream of said metering valve with respect to a flow direction of the reducing agent.

9. The device according to claim 1, including a reservoir for holding the reducing agent, said reducing agent line being fluidically connected to said reservoir.

10. The device according to claim 5, including a reservoir for holding the reducing agent, said branch line being fluidically connected to said reservoir.

11. The device according to claim 6, including a reservoir for holding the reducing agent, said branch line being fluidically connected to said reservoir.

12. The device according to claim 5, wherein said pressure control valve is a three-way valve disposed in said reducing agent line, and said three-way valve is fluidically connected to said branch line.

13. The device according to claim 6, wherein said pressure control valve is a three-way valve disposed in said reducing agent line, and said three-way valve is fluidically connected to said branch line.

14. The device according to claim 5, wherein said pressure control valve is a two-way valve disposed in said branch line.

15. The device according to claim 6, wherein said pressure control valve is a two-way valve disposed in said branch line.

16. The device according to claim 1, including a pressure extraction line fluidically connecting said control device to said gas line.

17. The device according to claim 2, including a pressure extraction line fluidically connecting said control device to said gas line, and said actuating member is a pneumatically controlled pressure control valve.

* * * * *